United States Patent [19]

Morikawa

[11] Patent Number: 5,751,081
[45] Date of Patent: May 12, 1998

[54] REDUCTION GEAR DEVICE WITH DIFFERENTIAL GEAR MECHANISM FOR ELECTRIC VEHICLE

[75] Inventor: Kunihiko Morikawa, Hiratsuka, Japan

[73] Assignee: Nissan Motor Co., Ltd., Yokohama, Japan

[21] Appl. No.: 459,609

[22] Filed: Jun. 2, 1995

[30] Foreign Application Priority Data

Jun. 2, 1994 [JP] Japan ................. 6-121083

[51] Int. Cl.$^6$ ................. H02K 7/06; B60K 17/35; F16H 3/44
[52] U.S. Cl. ................. 310/83; 180/249; 475/284
[58] Field of Search ................. 310/83; 475/221, 475/249, 280, 284, 283, 338, 285; 74/7 E; 180/249

[56] References Cited

U.S. PATENT DOCUMENTS

| | | | |
|---|---|---|---|
| 4,928,227 | 5/1990 | Burba et al. | 364/424.01 |
| 5,007,887 | 4/1991 | Asada | 475/284 |
| 5,246,408 | 9/1993 | Kobayashi | 475/221 |
| 5,248,284 | 9/1993 | Kobayashi et al. | 475/86 |
| 5,254,052 | 10/1993 | Kobayashi | 475/249 |
| 5,554,082 | 9/1996 | Umeyama et al. | 475/338 |

Primary Examiner—Steven L. Stephan
Assistant Examiner—Michael J. Wallace, Jr.
Attorney, Agent, or Firm—Foley & Lardner

[57] ABSTRACT

A reduction gear device with a differential gear mechanism 4 for an electric vehicle, has a planetary gear type reduction gear mechanism 3 for transmitting a power from an electric motor 2 to right and left wheels 6, 6 of the vehicle through the differential gear mechanism 4. The reduction gear mechanism 3 is contained in a casing 1, while either of output shafts 4a, 4b of the differential gear mechanism 4 penetrates an output shaft 2c of the electric motor 2. The reduction gear mechanism 3 comprises a plural of complex pinions P each formed by integrating a first pinion P1 and a second pinion P2 having a less number of teeth than that of the first pinion P1, a planetary carrier C3 connected to the output shaft 2c of the electric motor 2 and rotatably supporting each of the complex pinions P at certain positions on a common circle, a first ring gear R1 fixed onto the casing 1 and engaged with the first pinion P1 of each of the complex pinions P, and a second ring gear R2 engaged with the second pinion P2 of each of the complex pinions P and serving to transmit the power from the electric motor 2 to the differential gear mechanism 4. When utilizing a small size motor of high speed type as the electric motor 2, the reduction gear device can reduce a size of the device and simplify a construction of the device, while increasing a reduction ratio thereof.

5 Claims, 5 Drawing Sheets

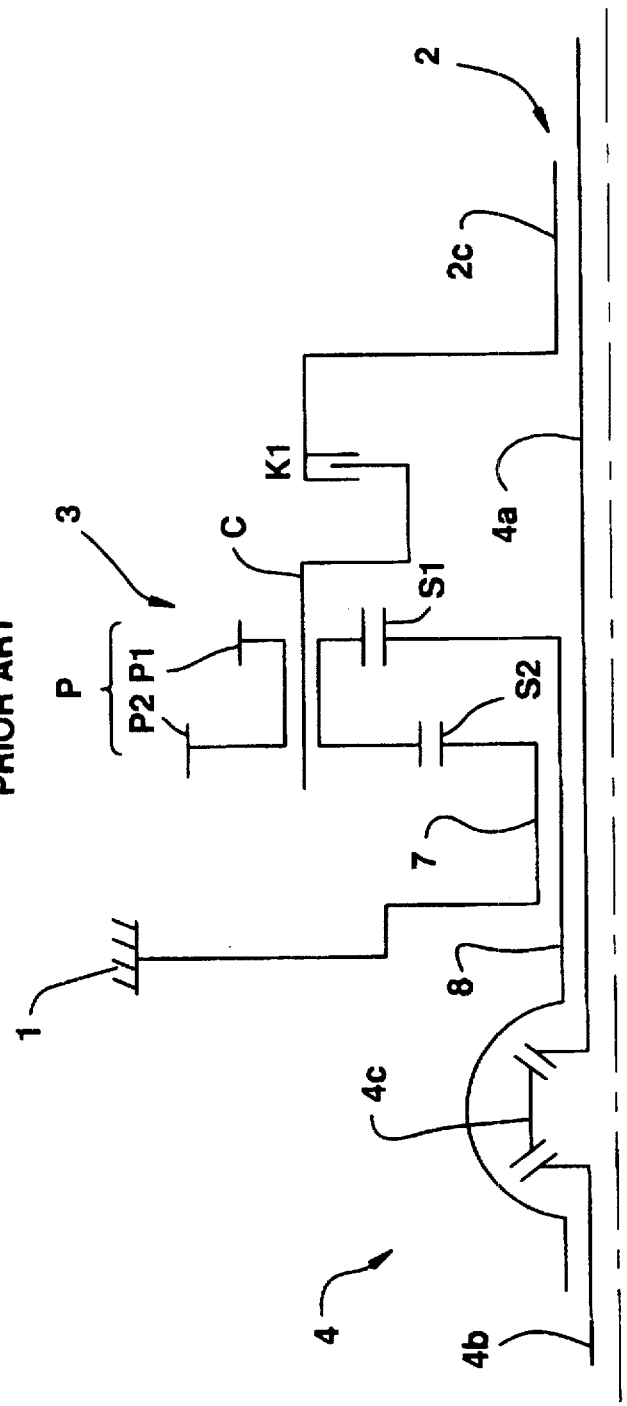

REDUCTION GEAR DEVICE WITH DIFFERENTIAL GEAR MECHANISM FOR ELECTRIC VEHICLE

BACKGROUND OF THE INVENTION

1. Field of the Present Invention

The present invention relates to a reduction gear device with a differential gear mechanism for an electric vehicle, having at least one planetary gear type reduction gear mechanism for transmitting a power from at least one electric motor to right and left wheels of the vehicle through the differential gear mechanism, the reduction gear mechanism being contained in a casing, while either of output shafts of the differential gear mechanism penetrating an output shaft of the at least one electric motor.

2. Description of the Related Art

A reduction gear device of the above-mentioned type is known by e.g. "The 9th International Electric Vehicle Symposium, November 1988". The know reduction gear device has a constitution shown in FIG. 4, wherein reference numeral 1 is a casing for a driving device of an electric vehicle. The casing 1 contains an electric motor 2 and the known reduction gear device including a planetary gear type reduction gear mechanism 3 and a bevel gear type differential gear mechanism 4. The electric motor 2 has a coil 2a, rotor 2b and a motor output shaft 2c. The planetary gear type reduction gear mechanism 3 has a sun gear S1 connected to the output shaft 2c of the motor 2, pinions P1 each engaged with the sun gear S1, a ring gear R2 fixed onto the casing 1, pinions P2 each formed integrally with each of the pinions P1 as a complex pinion P and each engaged with the ring gear R2, and a planetary carrier C rotatably supporting each of the complex pinions P. The bevel gear type differential gear mechanism 4 has a gear housing 4c formed integrally with the planetary carrier C of the reduction gear mechanism 3, a differential gear output shaft 4a penetrating the motor output shaft 2c for driving a right wheel 6 through a drive shaft 5, and another differential gear output shaft 4b for driving a left wheel 6 through another drive shaft 5.

In the known reduction gear device, a reduction ration i of the reduction gear mechanism 3 is found by calculating the following equation, wherein $Z_{P1}$ is the number of teeth of the pinion P1, $Z_{R2}$ is the number of teeth of the ring gear R2, $Z_{S1}$ is the number of teeth of the sun gear S1, and $Z_{P2}$ is the number of teeth of the pinion P2.

$$i = 1 + i_0;\ i_0 = (Z_{P1} \cdot Z_{R2})/(Z_{S1} \cdot Z_{P2}) > 1$$

For reducing a size of the motor 2, a high speed type motor has to be utilized for the motor 2 to obtain a required torque. Therefore, for designing the vehicle having e.g. a maximum speed of approximately 100 km/h with a high speed type motor rotatable over 10,000 rpm as the motor 2, the reduction ration i is required to be approximately 10, while the reduction ratio i of the known reduction gear device in FIG. 4 typically becomes approximately 5.7.

To increase the reduction ratio i so as to achieve the above-mentioned requirement, either of reduction of the value of $Z_{S1} \cdot Z_{P2}$ or increase of the value of $Z_{P1} \cdot Z_{R2}$ is required. However, since the differential gear output shaft 4a for the wheel 6 penetrates the motor output shaft 2c, the sun gear S1 carried by the motor output shaft 2c has to be hollowed, so that reduction of the number $Z_{S1}$ of teeth of the sun gear S1 is limited. Further, since the pinions P2 are rotatably supported by shafts of the planetary carrier C respectively, the pinions P2 have to be hollowed, so that reduction of the number $Z_{P2}$ of teeth of each of the pinions P2 is also limited. Therefore, reduction of pitch diameters of the sun gear S1 and the pinions P2 are limited. On the other hand, increase of the number $Z_{P1}$ of teeth of the pinions P1 and increase of the number $Z_{R2}$ of teeth of the ring gear R2 fixed to the casing 1 result in increase of pitch diameters of the pinions P1 and ring gear R2 which provide an enlargement of the reduction gear device. Further, since the ring gear R2 is engaged with the pinions P2, pitch diameter reduction of the ring gear R2 is limited.

Such a reduction gear device is arranged coaxially with a motor output shaft, and is to be placed under a floor of a vehicle and directed in a width direction of the vehicle. Thus, when reducing a size of the motor 2, an outer diameter of the known reduction gear device becomes so large that a minimum road clearance of the vehicle becomes small, which is undesirable for the vehicle.

Furthermore, since the known reduction gear device utilizes the bevel gear type differential gear mechanism 4, the known reduction gear device is axially elongated, which is also undesirable for the vehicle.

Another reduction gear device of the above-mentioned type is known from Japanese patent application laid open No. 332405/93. The known reduction gear device has a constitution shown in FIG. 5, wherein reference numeral 1 is a casing for a driving device of an electric vehicle. The casing 1 also contains an electric motor 2 (not shown) and the known reduction gear device including a planetary gear type reduction gear mechanism 3 and a bevel gear type differential gear mechanism 4. A motor output shaft 2c of the electric motor 2 is capable of being connected and disconnected through a clutch K1 to a planetary carrier C of the reduction gear mechanism 3, on which planetary carrier C complex pinions P of the reduction gear mechanism 3 are rotatably supported. Pinions P2 of one side of the complex pinions P are each engaged with a sun gear S2 as an opposing element of the reduction gear mechanism 3, which sun gear S2 is connected to the casing 1 through a hollow shaft 7. Pinions P1 of another side of the complex pinions P are each engaged with another sun gear S1 of the reduction gear mechanism 3, which sun gear S1 is connected to a gear housing 4c of the differential gear mechanism 4 through another hollow shaft 8. A driving torque is provided to wheels (not shown) through differential gear output shafts 4a, 4b, of which one shaft 4a penetrates the hollow shaft 8 of the sun gear S1, the hollow shaft 7 of the sun gear S2 and the motor output shaft 2c being hollowed.

In the latter known reduction gear device, a reduction ratio i of the device is found by calculating a following equation, wherein $Z_{P1}$ is the number of teeth of the pinion P1, $Z_{S2}$ is the number of teeth of the sun gear S2, $Z_{S1}$ is the number of teeth of the sun gear S1, and $Z_{P2}$ is the number of teeth of the pinion P2.

$$i = 1/(1-i_0);\ i_0 = (Z_{P1} \cdot Z_{S2})/(Z_{S1} \cdot Z_{P2});\ Z_{S1} > Z_{S2}$$

The known reduction gear device of the latter can be made smaller and can provide a larger torque than the known reduction gear device of the former owing to the reduction ratio i which can be increased than that of the known reduction gear device of the former.

However, since the differential gear output shaft 4a penetrates the hollow shafts 7, 8, the sun gear S1 carried by the hollow shaft 8 and the sun gear S2 carried by the hollow shaft 7 have to be hollowed, so that reduction of pitch diameters of the sun gears S1 and S2 are limited, while reduction of outer diameters of the hollow shafts 7, 8 are limited due to a requirement of transmitting a large torque provided by speed reduction. Further, since the pinions P1 and P2 are rotatably supported by shafts of the planetary carrier C respectively, the pinions P1, P2 have to be hollowed, so that reduction of pitch diameters of the pinions P1, P2 are also limited.

Thus, when reducing a size of the motor 2, an outer diameter of the latter known reduction gear device also becomes so large that a minimum road clearance of the vehicle becomes small undesirably.

Furthermore, since the latter known reduction gear device also utilizes the bevel gear type differential gear mechanism 4, the latter known reduction gear device is axially elongated undesirably.

SUMMARY OF THE INVENTION

It is therefore an object of the present invention to provide a reduction gear device of the type defined in the first paragraph, which can overcome the above-mentioned problems of the known reduction gear devices.

In the reduction gear device according to the present invention, the at least one planetary gear type reduction gear mechanism comprises a plural of complex pinions each formed by integrating a first pinion and a second pinion having a less number of teeth than that of the first pinion, a planetary carrier connected to the output shaft of the at least one electric motor and rotatably supporting each of the complex pinions at certain positions on a common circle, a first ring gear fixed onto the casing and engaged with the first pinion of each of the complex pinions, and a second ring gear engaged with the second pinion of each of the complex pinions and serving to transmit the power from the at least one electric motor to the differential gear mechanism.

With the reduction gear device according to the present invention, a greater value of the reduction ratio can be obtained owing to the constitution of the planetary gear type reduction gear mechanism, while no sun gear is required in the reduction gear mechanism, so that the above-mentioned requirement of a large reduction ratio can be achieved without enlarging an outer diameter of the reduction gear device.

In a preferred embodiment according to the present invention, the differential gear mechanism is of a double pinion planetary gear type, which having a ring gear for receiving the power from the second ring gear, and a planetary carrier and a sun gear each for transmitting the power to the right and left wheels.

With the preferred embodiment according to the present invention, the double pinion planetary gear type differential gear mechanism has a shorter axial length than that of the bevel gear type differential gear mechanism of the known devices, so that an axial length of the reduction gear device of the preferred embodiment can be shortened.

In a further preferred embodiment according to the present invention, the second ring gear of the at least one planetary gear type reduction gear mechanism and the ring gear of the double pinion planetary gear type differential gear mechanism consist of a common ring gear.

With the further preferred embodiment according to the present invention, since at least two ring gears consist of a common ring gear, the number of parts of the reduction gear device can be reduced, and the construction of the reduction gear device can be simplified.

In another preferred embodiment according to the present invention, two motors as the at least one electric motor occupy both ends of an inner space of the casing respectively, while the double pinion planetary gear type differential gear mechanism occupies a center of the inner space of the casing, each of two reduction gear mechanisms as the at least one planetary gear type reduction gear mechanism being placed between the differential gear mechanism and each of the motors.

With the preferred embodiment according to the present invention, since two motors are provided, a size of each of the motors can be reduced, so that a further reduction of an overall size of the reduction gear device can be achieved.

BRIEF DESCRIPTION OF THE DRAWINGS

The present invention will now be explained in more detail with reference to preferred embodiments shown in the attached drawings, wherein similar parts are indicated by the same reference numeral so as to simplify the explanation, in which:

FIG. 5 is a schematic drawing of the known reduction gear device of the latter.

DETAILED EXPLANATION OF THE PREFERRED EMBODIMENTS

Figure 1:
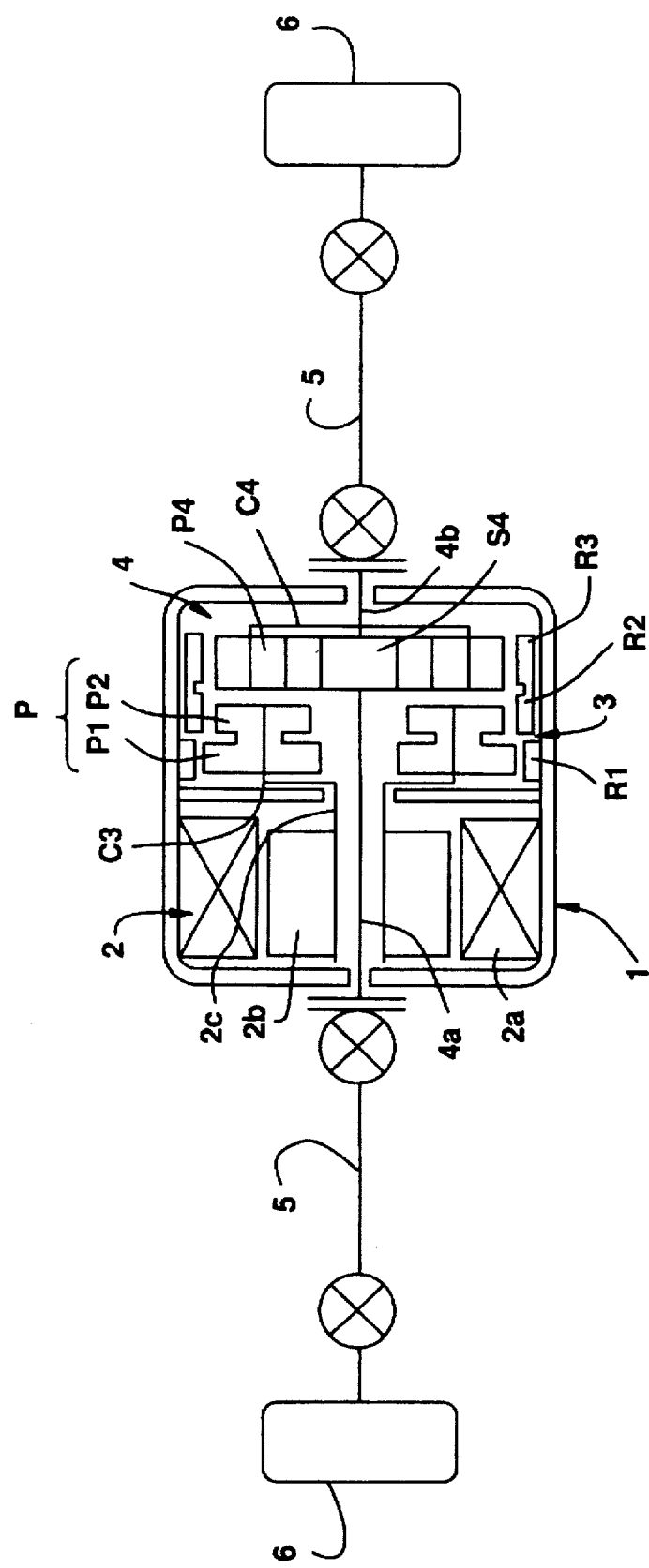
FIG. 1 is a schematic drawing of a first preferred embodiment of the reduction gear device according to the present invention.

Referring now to FIG. 1, there is shown a first preferred embodiment of the reduction gear device for an electric vehicle in accordance with the present invention, which reduction gear device includes a differential gear mechanism 4. The reduction gear device has a planetary gear type reduction gear mechanism 3 for transmitting a power from an electric motor 2 to right and left wheels 6, 6 of the vehicle through the differential gear mechanism 4, the reduction gear mechanism being contained in a casing 1, while either of output shafts 4a, 4b of the differential gear mechanism 4 penetrating an output shaft 2c of the electric motor 2.

In the first embodiment of the reduction gear device, the planetary gear type reduction gear mechanism 3 comprises a plural of complex pinions P each formed by integrating a first pinion P1 and a second pinion P2 which has a less number of teeth than that of the first pinion P1, a planetary carrier C3 connected to the output shaft 2c of the electric motor 2 and rotatably supporting each of the complex pinions P at certain positions on a common circle, a first ring gear R1 fixed onto the casing 1 and engaged with the first pinion P1 of each of the complex pinions P, and a second ring gear R2 engaged with the second pinions P2 of each of the complex pinions P and serving to transmit the power from the electric motor 2 to the differential gear mechanism 4.

The differential gear mechanism 4 is of a double pinion planetary gear type. The differential gear mechanism 4 has a ring gear R3 for receiving the power from the second ring gear R2 of the reduction gear mechanism 3, a planetary carrier C4 for transmitting the power from the reduction gear mechanism 3 to the right wheel 6, through a drive shaft 5, a sun gear S4 for transmitting the power to the left wheels 6 through another drive shaft 5, and a plural of pairs of pinions P4 mutually engaged and one of which being engaged with the ring gear R3 while the other of which being engaged with the sun gear S4.

In the first embodiment of the reduction gear device for an electric vehicle in accordance with the present invention, the power from the motor 2 is received by the planetary carrier C3 and transmitted form the second ring gear R2 engaged with the second pinion P2 to the the ring gear R3 of differential gear mechanism 4. A reduction ratio i of the reduction gear mechanism 3 is found by calculating the following equation, wherein $Z_{P1}$ is the number of teeth of the pinion P1, $Z_{R2}$ is the number of teeth of the ring gear R2, $Z_{R1}$ is the number of teeth of the ring gear R1, and $Z_{P2}$ is the number of teeth of the pinion P2.

$$i=i_0/(1-i_0);\ i_0=(Z_{P1}\cdot Z_{R2})/(Z_{R1}\cdot Z_{P2});\ Z_{R1}>Z_{R2}$$

For example, assuming the number $Z_{R1}=81$, the number $Z_{P1}=25$, the number $Z_{P2}=21$, and the number $Z_{R2}=75$, the reduction ratio i=10.78 is found from the equation.

Thus, with the first embodiment according to the present invention, a greater value of the reduction ratio can be obtained owing to the constitution of the planetary gear type reduction gear mechanism 3, while no sun gear is required in the reduction gear mechanism 3, so that the aforementioned requirement of a large reduction ratio can be achieved without enlarging an outer diameter of the reduction gear device.

In the differential gear mechanism 4, the power received by the ring gear R3 is transmitted to the wheels 6, 6, from the planetary carrier C4 on one side, and from the sun gear S4 on the other side. Between the number of revolutions (i.e. the revolution speed) Nc of the planetary carrier C4, the number of revolutions Ma of the sun gear S4 and the number of revolutions Nr of the ring gear R3, there is the following relationship, wherein $Z_S$ is the number of teeth of the sun gear S4, $Z_R$ is the number of teeth of the ring gear R3, and $\lambda$ is a ratio of the numbers of teeth (i.e. $\lambda=Z_S/Z_R$).

$$(1-\lambda)Nc=Nr-\lambda Na$$

When the number of revolutions Na of the sun gear S4 becomes less, by $\Delta N$, than the number of revolutions Nr of the ring gear R3 due to an occurrence of difference between the numbers of revolutions of the right and left wheels 6, 6, the above-mentioned equation is deformed as follows.

$$(1-\lambda)Nc=Nr-\lambda(Nr-\Delta N)$$

Therefore, the number of revolutions Nc of the planetary carrier C4 is found by calculating the following equation.

$$Nc=Nr+\{\lambda/(1-\lambda)\}\cdot \Delta N$$

When the number of teeth are selected so that the ratio $\lambda$ becomes e.g. approximately 0.5 (i.e. $\lambda=0.5$), the number of revolutions Nc is found by calculating the following equation.

$$Nc=Nr+\Delta N$$

Thus, the number of revolutions Nc of the planetary carrier C4 becomes greater, by $\Delta N$, than the number of revolutions Nr of the ring gear R3, so that the gear mechanism 4 operates as a typical differential gear device. The axial length of the double pinion planetary gear type differential gear mechanism 4 in the first embodiment can be shortened equal to or less than a half of the axial length of the bevel gear type differential gear mechanism 4 of the known devices.

Figure 2:
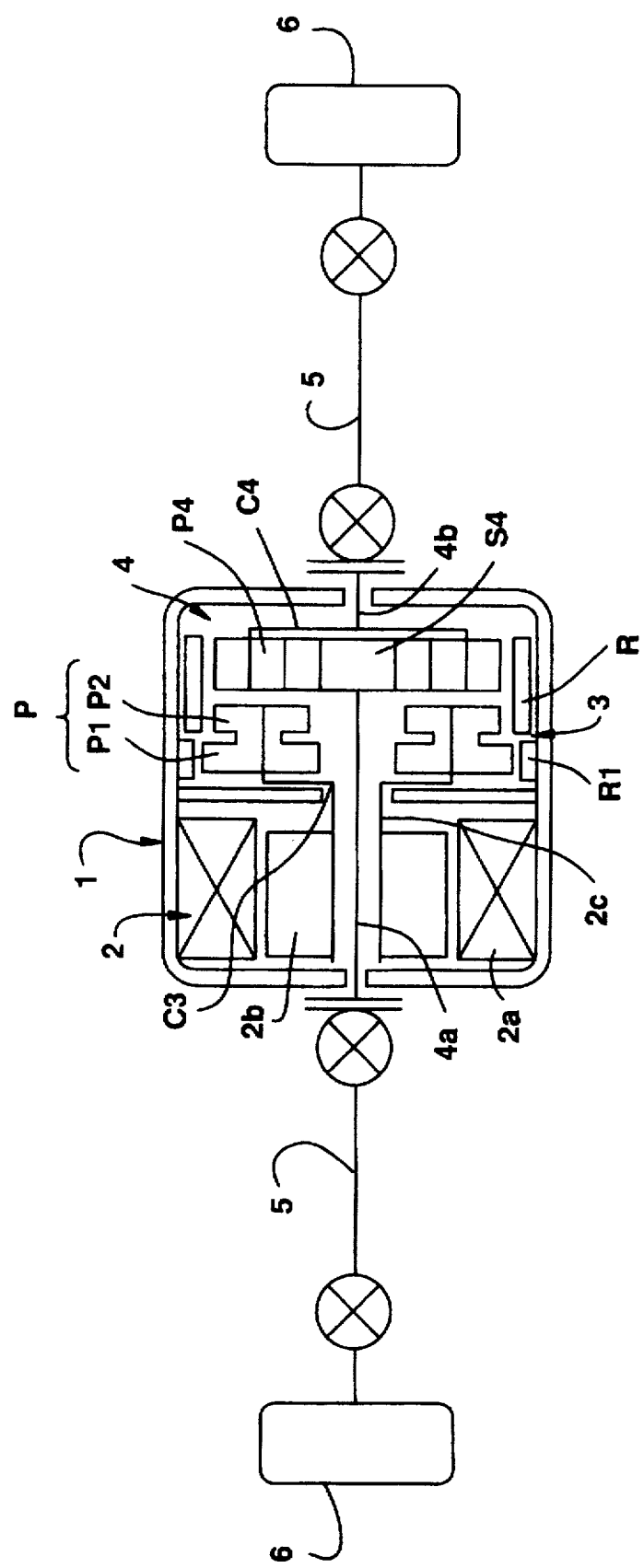
FIG. 2 is a schematic drawing of a second preferred embodiment of the reduction gear device according to the present invention.

FIG. 2 shows a second preferred embodiment of the reduction gear device for an electric vehicle in accordance with the present invention. The second embodiment of the reduction gear device is constituted similar to the first embodiment except for a common ring gear R in the second embodiment. That is, in the second embodiment, the common ring gear R is provided as the second ring gear R2 of the planetary gear type reduction gear mechanism 3 and the ring gear R3 of the double pinion planetary gear type differential gear mechanism 4.

With the second embodiment according to the present invention, except for the reduction gear device providing the same effects as that of the first embodiment, since two ring gears R2, R3 consist of a common ring gear R, the number of parts of the reduction gear device can be reduced, and the construction of the reduction gear device can be simplified.

Figure 3:
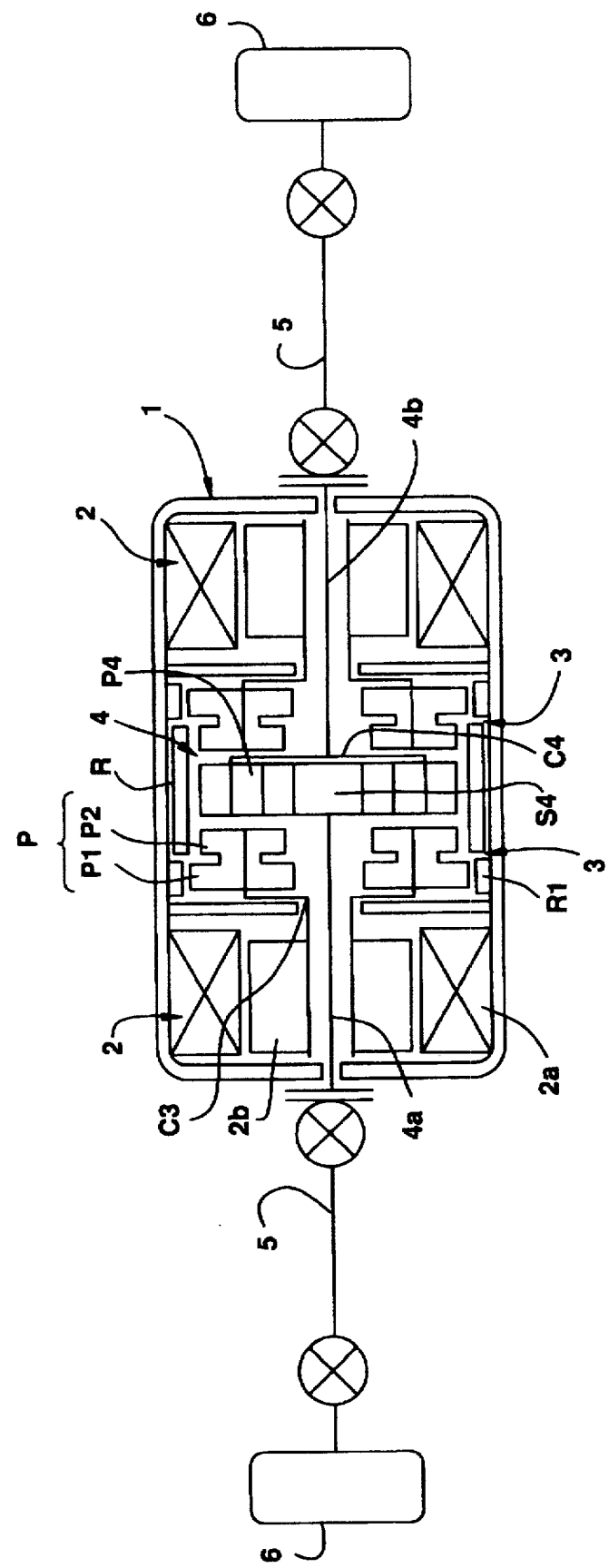
FIG. 3 is a schematic drawing of a third preferred embodiment of the reduction gear device according to the present invention.
Figure 4:
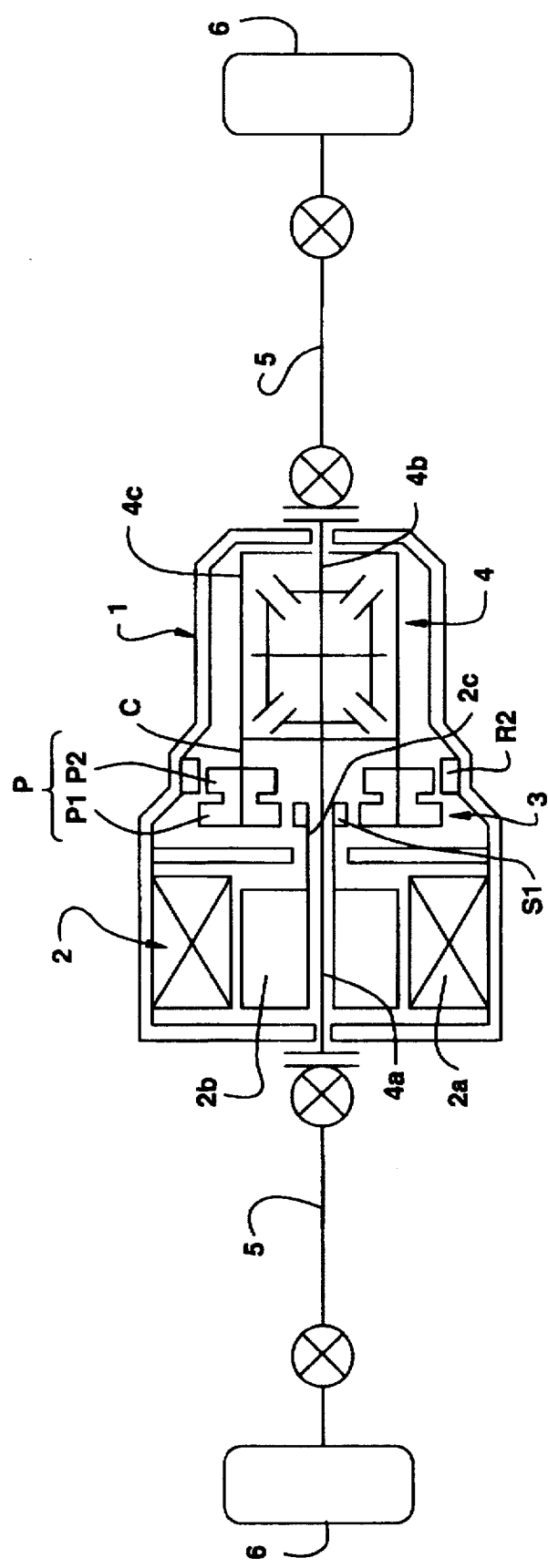
FIG. 4 is a schematic drawing of the known reduction gear device of the former.

FIG. 3 shows a third preferred embodiment of the reduction gear device for an electric vehicle in accordance with the present invention. The third embodiment of the reduction gear device is constituted similar to the second embodiment except for two electric motors 2, 2 and two reduction gear mechanisms 3, 3 provided in the third embodiment. That is, in the third embodiment, the two electric motors 2, 2 occupy both ends of an inner space of the casing 1 respectively, while the differential gear mechanism 4 of double pinion planetary gear type occupies a center of the inner space of the casing 1. Then, each of the two reduction gear mechanism 3, 3 of planetary gear type is placed between the differential gear mechanism 4 and each of the motors 2, 2.

With the third embodiment according to the present invention, except for the reduction gear device providing the same effects as that of the first embodiment, since the two motors 2, 2 are provided, a size of each of the motors 2, 2 can be reduced, so that a further reduction of an overall size of the reduction gear device can be achieved. Incidentally, the number of parts of the reduction gear device can be further reduced, owing to the common ring gear R as three ring gears R2, R3, R2.

The foregoing description is by way of example only, and not intended to limit the scope of the appended claims.

I claim:

1. A reduction gear device for a vehicle having an electric motor, including a differential gear mechanism and a planetary gear type reduction gear mechanism, the differential gear mechanism being connected to a right wheel and a left wheel of the vehicle respectively through two output shafts, said reduction gear mechanism being contained in a casing mounted on the vehicle and transmitting power from the electric motor to the right and left wheels through the differential gear mechanism, an output shaft of the electric motor being penetrated by one of the output shafts of the differential gear mechanism, wherein said reduction gear mechanism comprises:

a plurality of complex pinion assemblies each including a first pinion having a first number of teeth and a second pinion having a second number of teeth, said second number of teeth being less than said first number of teeth, said first and second pinions being integrated with each other;

a planetary carrier connected to said output shaft of said electric motor and rotatably supporting said complex pinion assemblies at positions spaced radially from a rotating axis of said planetary carrier by an equal amount and spaced from each other by a predetermined angle;

a first ring gear fixed to said casing and engaged with said first pinion of each of said complex pinion assemblies; and a second ring gear engaged with said second pinion of each of said complex pinion assemblies and serving to transmit power from said electric motor to said differential gear mechanism.

2. A reduction gear device for an electric vehicle according to claim 1, wherein said differential gear mechanism is of a double pinion planetary gear type, and comprises a ring gear, a planetary carrier and a sun gear, said ring gear receiving power from said second ring gear of said reduction gear mechanism, and said planetary carrier and said sun gear transmitting power to the right and left wheels.

3. A reduction gear device for an electric vehicle according to claim 2, wherein said second ring gear of said reduction gear mechanism and said ring gear of said differential gear mechanism consist of a common ring gear.

4. A reduction gear device for a vehicle having two electric motors, including a differential gear mechanism and two planetary gear type reduction gear mechanisms, the differential gear mechanism having two output shafts through which the differential gear mechanism is connected to a right wheel and a left wheel of the vehicle respectively, the two reduction gear mechanisms being contained in a casing mounted on the vehicle, each of the two reduction gear mechanisms transmitting power from an adjacent one of the two electric motors to the right and left wheels through the differential gear mechanism;

wherein said two electric motors occupy opposite ends of an inner space of said casing respectively, said differential gear mechanism occupies a center of said inner space of said casing, an output shaft of each of said electric motors is penetrated by an adjacent one of said two output shafts of said differential gear mechanism, each of said two reduction gear mechanisms is placed between said differential gear mechanism and said adjacent one of the two electric motors, and comprises:

a plurality of complex pinion assemblies each including a first pinion having a first number of teeth and a second pinion having a second number of teeth, said second number of teeth being less than said first number of teeth, said first and second pinions being integrated with each other;

a planetary carrier connected to said output shaft of said adjacent one of the two electric motors and rotatably supporting said complex pinion assemblies at positions spaced radially from a rotating axis of said planetary carrier by an equal amount and spaced form each other by a predetermined angle;

a first ring gear fixed to said casing and engaged with said first pinion of each of said complex pinion assemblies;

a second ring gear engaged with said second pinion of each of said complex pinion assemblies and serving to transmit power from said adjacent one of said two electric motors to said differential gear mechanism; and said differential gear mechanism is of a double pinion planetary gear type, and comprises a ring gear, a planetary carrier and a sun gear, said ring gear receiving power from said second ring gears of said two reduction gear mechanisms, and said planetary carrier and said sun gear transmit power to said right and left wheels.

5. A reduction gear device for an electric vehicle according to claim 4, wherein said second ring gears of said two reduction gear mechanisms and said ring gear of said differential gear mechanism consists of a common ring gear.

* * * * *